US006398535B1

(12) United States Patent
Cloeren (10) Patent No.: US 6,398,535 B1
(45) Date of Patent: Jun. 4, 2002

(54) LAYER SEQUENCE SELECTING DEVICE

(75) Inventor: Peter F. Cloeren, Orange, TX (US)

(73) Assignee: Cloeren Incorporated, Orange, TX (US)

( * ) Notice: Subject to any disclaimer, the term of this patent is extended or adjusted under 35 U.S.C. 154(b) by 0 days.

(21) Appl. No.: 09/531,621

(22) Filed: Mar. 21, 2000

(51) Int. Cl.$^7$ .............................................. B29C 47/06
(52) U.S. Cl. ............................. 425/131.1; 425/133.5; 425/190; 425/192 R; 425/462
(58) Field of Search .................... 425/131.1, 133.1, 425/133.5, 190, 192 R, 462

(56) References Cited

U.S. PATENT DOCUMENTS

| | | | |
|---|---|---|---|
| 3,382,534 A | * 5/1968 | Veazey | 425/131.5 |
| 3,924,990 A | 12/1975 | Schrenk | 425/131.1 |
| 4,144,011 A | * 3/1979 | Sponaugle | 425/133.5 |
| 4,443,397 A | 4/1984 | Hahn et al. | 425/131.1 |
| 4,483,669 A | 11/1984 | Hahn et al. | 425/131.1 |
| 4,784,815 A | * 11/1988 | Cloeren et al. | 264/173.12 |
| 4,839,131 A | 6/1989 | Cloeren | 425/131.1 |
| 5,102,323 A | 4/1992 | Blemberg | 425/131.1 |

FOREIGN PATENT DOCUMENTS

GB    2220164    1/1990

OTHER PUBLICATIONS

"Coextrusion takes a giant step into the future," *Modern Plastics*, Aug. 1983, McGraw–Hill Inc.

* cited by examiner

*Primary Examiner*—Nam Nguyen
*Assistant Examiner*—Joseph Leyson
(74) *Attorney, Agent, or Firm*—Timothy R. Kroboth (57) ABSTRACT

An extrusion apparatus which simplifies changing the relative order of layers of a coextruded laminate, is provided. Advantageously, the apparatus includes an interchangeably disposed, layer sequence selecting device which can be changed out without disassembly of other extrusion apparatus.

16 Claims, 6 Drawing Sheets

LAYER SEQUENCE SELECTING DEVICE

FIELD OF THE INVENTION

This invention relates to changing the layer sequence of a coextrusion extrudate.

BACKGROUND OF THE INVENTION

U.S. Pat. No. 4,839,131 to Cloeren and U.S. Pat. No. 5,102,323 to Blemberg disclose an exchangeable plug for changing the relative order of layers of an extrudate, in which the circumferential plug surface is provided with a plurality of channels. Under certain circumstances, leakage between plug channels can occur because of the mechanical clearance for plug removal. Reduction in the mechanical clearance can result in galling of the plug to the bore. Furthermore, manufacturing a tapered bore and a mating tapered plug with precise registering of channels, is an arduous task not practical in mass production.

Other approaches for changing the relative order of layers of an extrudate are illustrated by UK Patent Application No. 2,220,164 published January 1990, and U.S. Pat. Nos. 3,924,990, 4,443,397 and 4,483,669. The UK Application describes use of a set of distribution blocks interchangeably disposed between an entry block (or feed source) and a coextrusion block, and that an individual distribution block may comprise a stack of interchangeable plates. The U.S. Patents similarly describe changing the order of layers by exchanging apparatus disposed between rigidly connected feed pipes and a forming means shaping individual streams into a shape suitable for layering. However, a drawback of these approaches is that loosening or disconnecting feed pipes from the coextrusion apparatus, separation of feed sources from the forming means, and/or separation of the die body from the coextrusion apparatus is typically necessary for the exchange.

Accordingly, there is a need for a coextrusion apparatus which simplifies changing the relative order of layers of a coextruded extrudate.

SUMMARY OF THE INVENTION

In accordance with the present invention, there is provided a coextrusion apparatus which includes an interchangeably disposed device for selecting a relative order of layers in a combined stream. In fluid communication therewith, the apparatus further includes a channeled arrangement for suitably directing flow of a plurality of streams.

In a preferred embodiment, the interchangeably disposed, layer sequence selecting device is beneficially used in combination with a directing/combining assembly which includes a plurality of feed channels for directing feed streams to the layer sequence selecting device, and a plurality of connecting channels in fluid communication with, and for directing the streams from the layer sequence selecting device to, a downstream combining channel. The layer sequence selecting device includes a plurality of flow sequence selecting channels which register with the respective feed channels and connecting channels. An advantageous feature is that a feed channel exit opening is disposed relative to an entry opening of a respective connecting channel so that flow through the exit opening is in a direction generally opposite to the direction of flow through the entry opening.

In a second preferred embodiment, the interchangeably disposed, layer sequence selecting device is advantageously used in combination with a flow directing block and with an assembly for combining a plurality of streams and coextrusion of a multilayer extrudate which includes a combining channel and downstream thereof, an extrusion orifice. The flow directing block includes a plurality of feed channels for directing feed streams to the layer sequence selecting device, and a plurality of connecting channels in fluid communication with, and for directing the streams from the layer sequence selecting device to, the combining/extruding assembly. As before, the layer sequence selecting device includes a plurality of flow sequence selecting channels registering with the respective feed channels and connecting channels, and a feed channel exit opening is beneficially disposed relative to an entry opening of a respective connecting channel so that flow through the exit opening is in a direction generally opposite to the direction of flow through the entry opening.

Beneficially, an apparatus in accordance with the invention, provides for changing the relative order of layers of a coextrusion extrudate without disassembly of extrusion apparatus structure other than removal and interchanging of the layer sequence selecting device. In addition, such an apparatus avoids need for mechanical clearance as is necessary between a removable plug and its respective bore.

Additional advantages and beneficial features of the present invention are set forth in the drawing and detailed description, and in part will become apparent to those skilled in the art upon examination of the drawing and detailed description or may be learned by practice of the invention. In the drawing and detailed description, there are shown and essentially described only preferred embodiments of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention, and depicts preferred embodiments of an apparatus in accordance with the present invention.

DETAILED DESCRIPTION OF THE INVENTION

Figure 1:
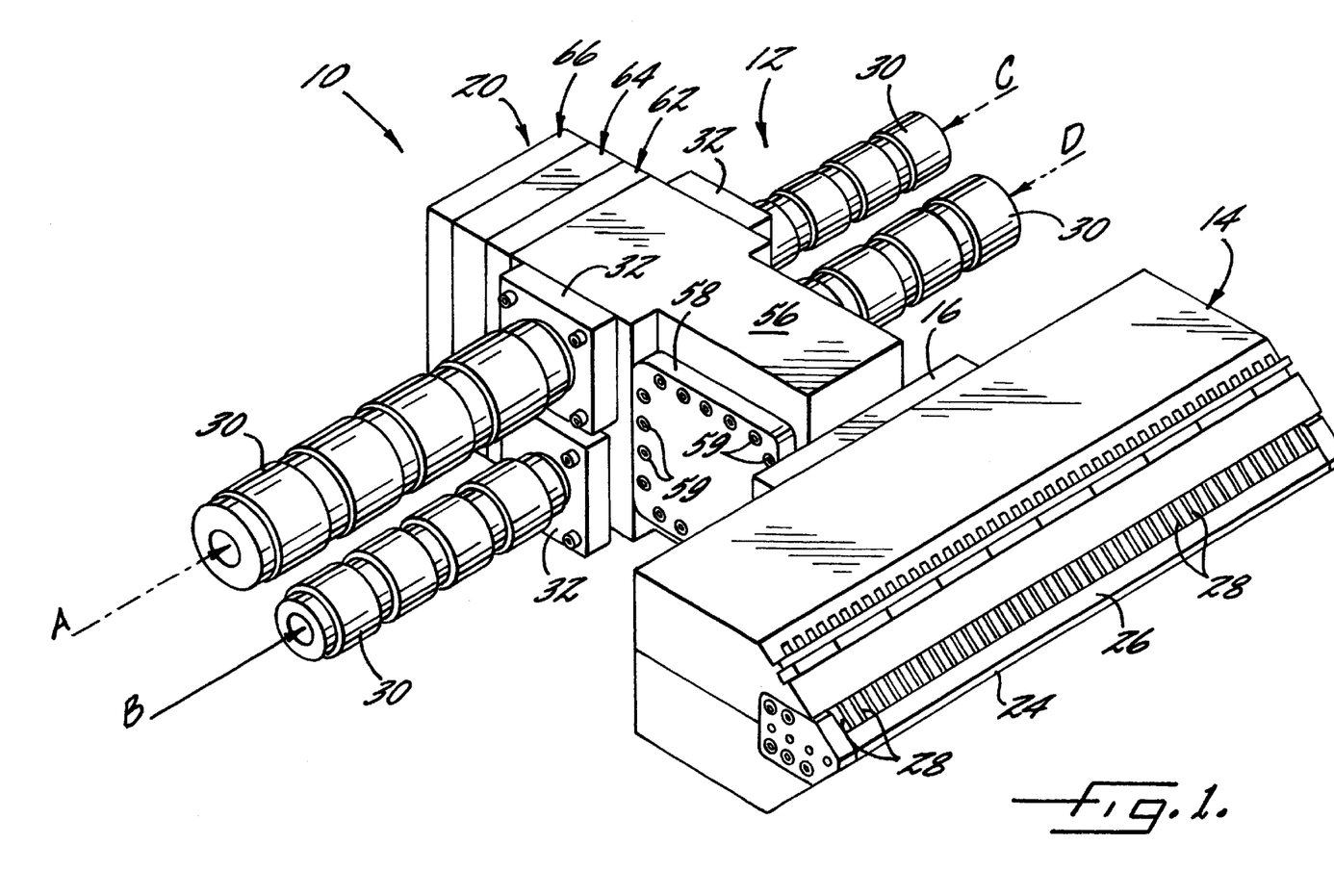
FIG. 1 is a perspective view of a preferred coextrusion apparatus in accordance with the present invention.

Referring to FIG. 1, a coextrusion apparatus in accordance with the present invention, is shown. The apparatus includes an assembly 12 for directing flow of multiple streams and for combining multiple streams into a combined stream, a die body 14, and a die plate 16 which conveniently connects assembly 12 to die body 14. In addition, in accordance with the invention, the apparatus beneficially includes an interchangeably disposed, layer sequence selecting device 20. Feed pipes 30 for feed streams A,B,C,D conveniently connect between extruders (not shown) and assembly 12 via mounting blocks 32. Typically, the feed streams will differ from one another, and combining of feed streams thus produces a composite stream.

Figure 2:
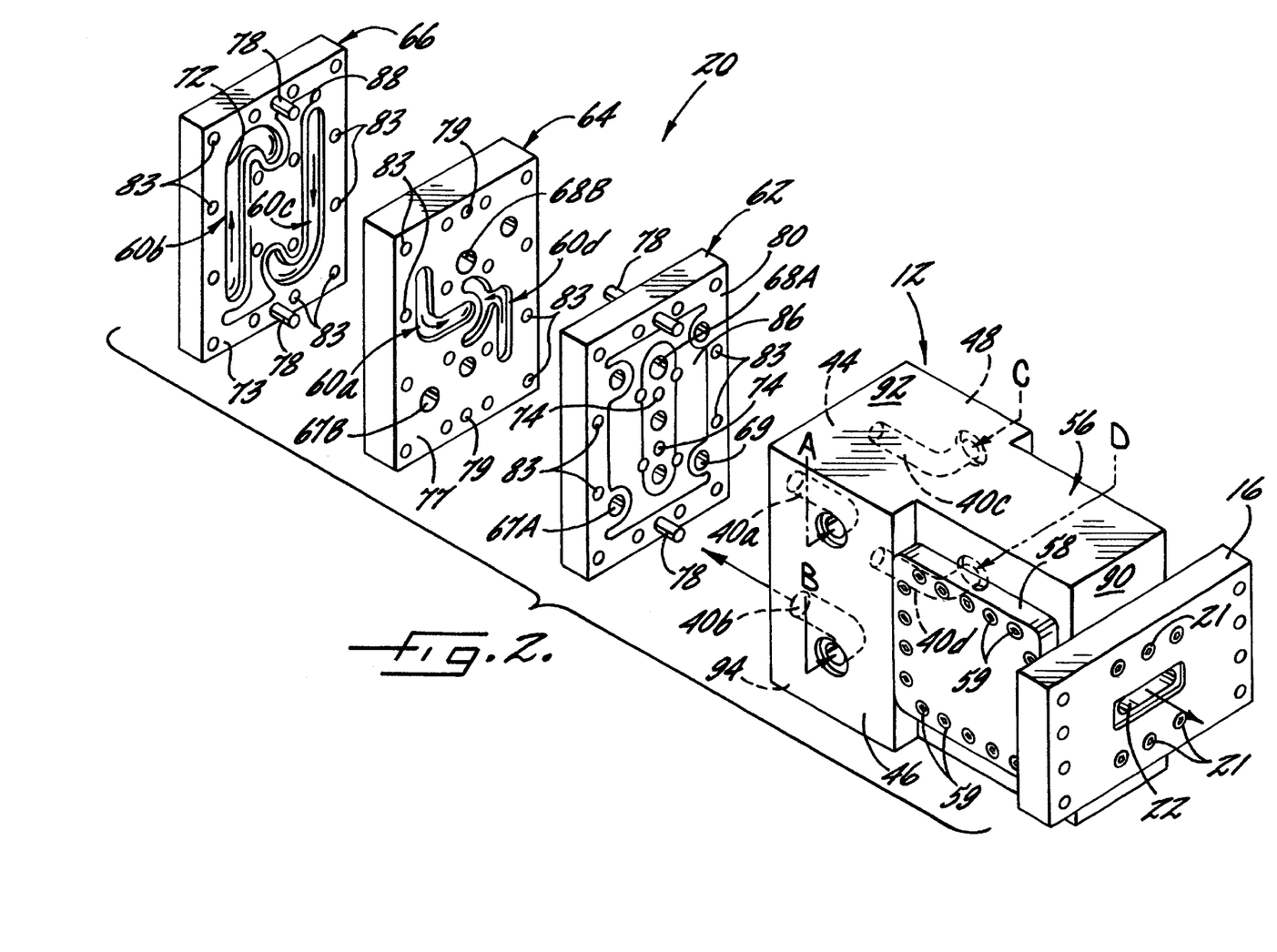
FIG. 2 is a partially exploded perspective view of a portion of the apparatus of FIG. 1.

Referring also to FIG. 2, a plurality of bolts 21 secure die plate 16 to assembly 12, and a channel 22 of the die plate connects between an exit channel (not shown) of assembly 12 and an input channel (not shown) of die body 14. An arrow depicts the direction of flow of the combined stream in the exit channel, channel 22 and the input channel. Within the die body the combined stream, in addition to flow in the main flow direction shown by the arrow, undergoes transverse flow, and thereafter a wider, thinner multilayer extrudate exits from an exit orifice 24.

Beneficially, a flexible lip 26 forms the exit orifice. A plurality of lip adjustment rods 28 spaced apart from one another along the width of the exit orifice, conveniently control the gap of the exit orifice, advantageously through lengthwise expansion and contraction of rods 28 under automated control.

Figure 3:
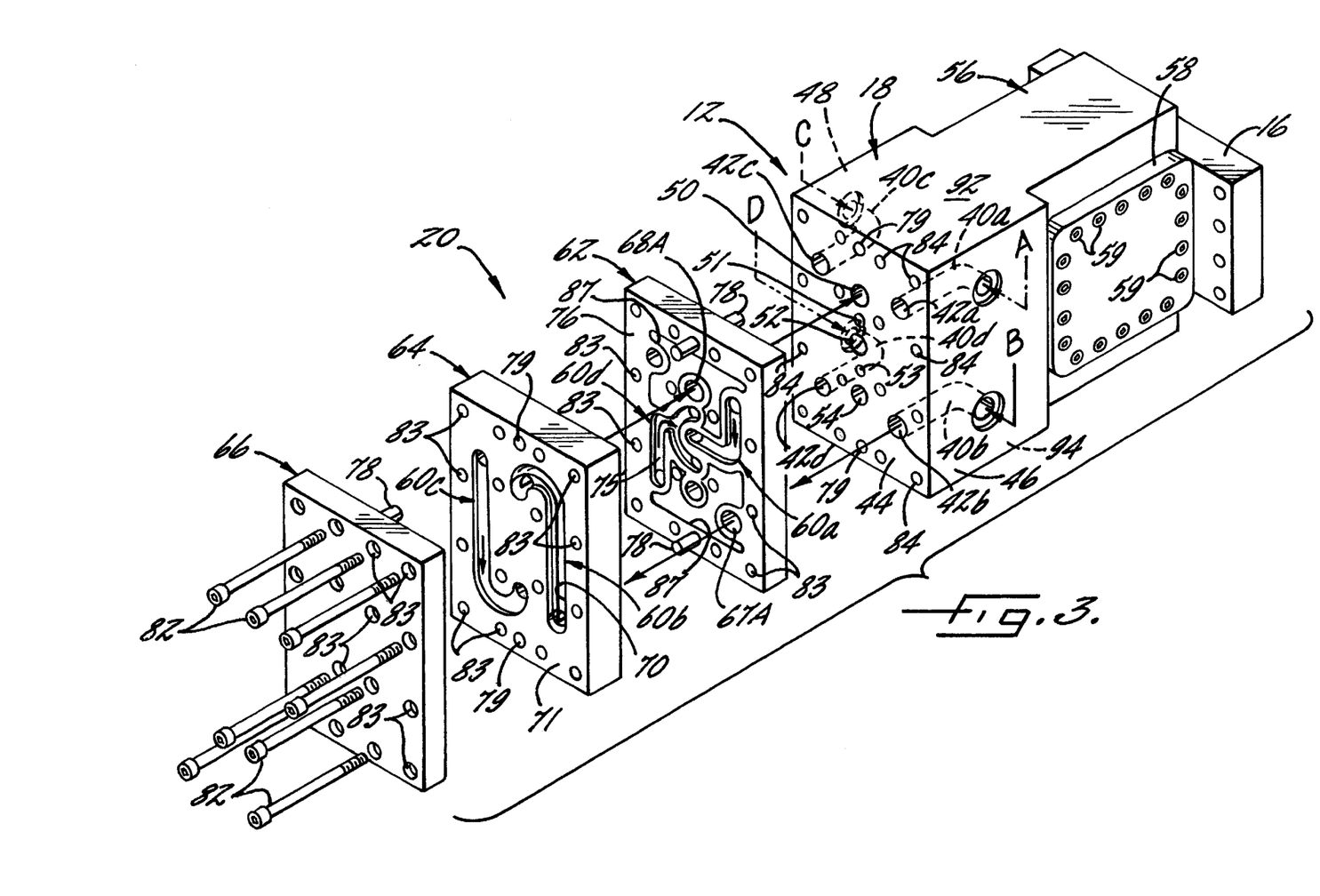
FIG. 3 is like FIG. 2 but from a different perspective.

With reference also to FIG. 3, directing/combining assembly 12 includes a flow directing block portion 18, which includes a plurality of feed channels 40a–d for receiving feed streams A,B,C,D and appropriately directing the feed streams. Flow from channels 40a–d is directed through outlets 42a–d disposed in a face 44 of block portion 18. An arrow which begins at outlet 42b denotes the direction of flow from channel 40b; and referring also to FIG. 2, this direction of flow is generally opposite to the main direction of flow shown by the arrow depicting the direction of flow from channel 22. It will be understood that there is a like direction of flow through outlets 42a,c,d.

Face 44 is generally perpendicular to inlet faces 46,48. The feed channels are appropriately configured to provide for this generally perpendicular relationship. To this end, the feed channels include an about 90° turn between the inlet faces and face 44.

Block portion 18 of directing/combining assembly 12 also includes a plurality of connecting channels 50,51,52,53,54 (indicated by the channel inlets) in fluid communication with, and for directing multiple feed streams from layer sequence selecting device 20 to, a combining channel (not shown) after shaping of the streams into a shape suitable for layering and converging of the shaped streams. The channel inlets are in face 44 of assembly 12. The direction of flow into connecting channel 50 is denoted by an arrow entering channel 50, it being understood that there is a like direction of flow into channels 51–54.

Beneficially, as shown in FIG. 3, the flow through outlet 42b and the flow through the entry opening of connecting channel 50 are in generally opposite directions. In addition, stream B at inflow to layer sequence selecting device 20 is generally parallel to stream B at outflow from device 20. Likewise, advantageously, flow through face 44 for the other paired feed and connecting channels, is in generally opposite directions, and a particular stream is generally parallel at inflow to, and outflow from, device 20.

As will be understood by one skilled in the art, combining multiple streams into a composite stream includes shaping the individual streams into a shape suitable for layering, and converging the shaped streams. Thus, assembly 12 includes structure and features necessary to shape streams and converge the shaped streams into a composite stream, details of which may be suitably found in the prior art. The combining channel conveniently leads to the exit channel, through which the combined stream passes from assembly 12. Shaping and combining occur in combining portion 56 of assembly 12, and side plates 58 (only one shown) enclose the combining portion including the combining channel. A plurality of fasteners 59 secure the endplates to assembly 12.

Figure 6:
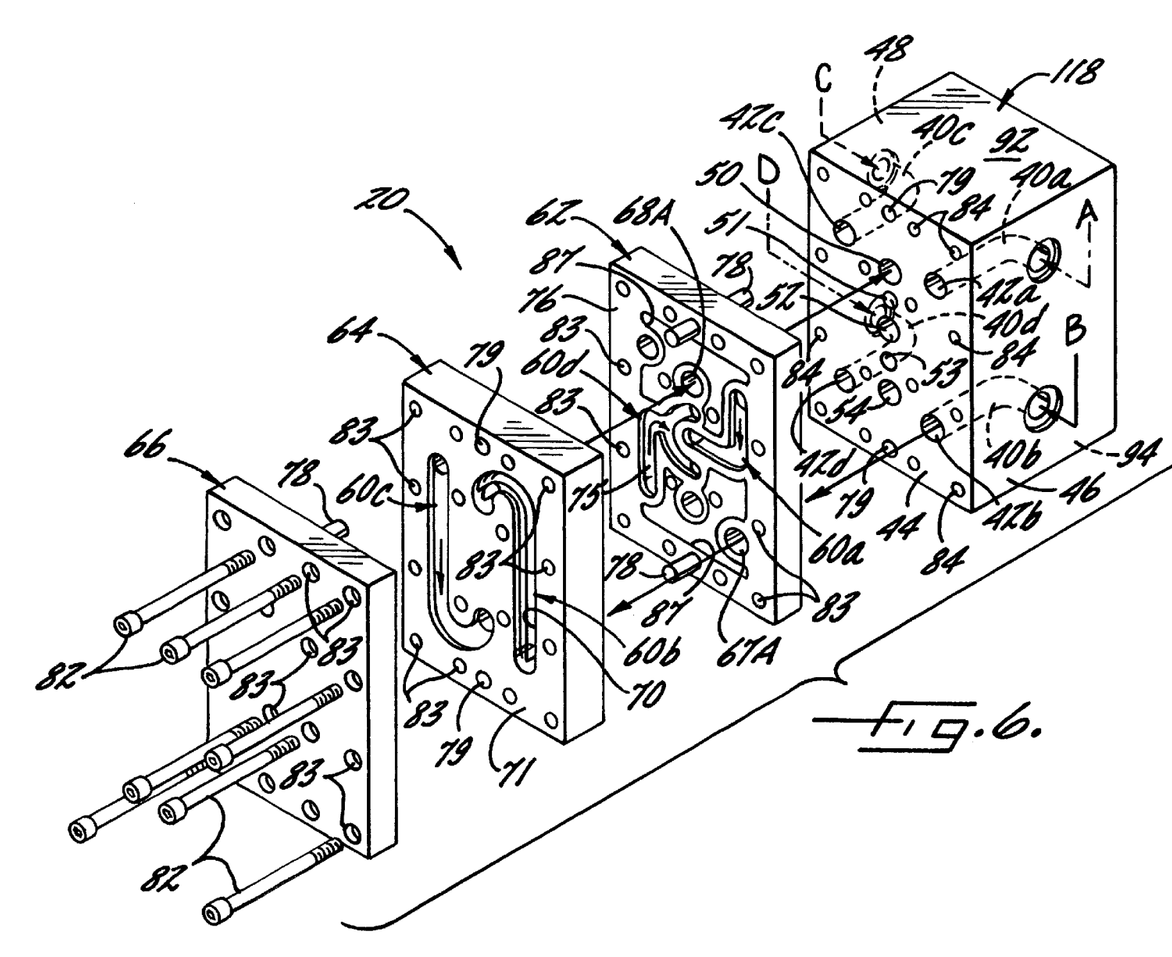
FIG. 6 is a partially exploded perspective view similar to FIG. 3, of the layer sequence selecting device of FIGS. 1–3 in combination with a flow directing block.

As shown in FIG. 6 and described later in further detail, flow directing block portion 18 of assembly 12 could be a separate structure from combining portion 56.

With continued reference to FIGS. 2 and 3 in particular, interchangeably disposed, layer sequence selecting device 20 includes a plurality of flow sequence selecting channels 60a–d. Arrows within each channel 60 indicate direction of flow. Each flow sequence selecting channel registers with one of the feed channels and at least one connecting channel. Thus, channel 60a registers with channels 40a,52, channel 60b registers with channels 40b,50, channel 60c registers with channels 40c,54, and channel 60d registers with channels 40d,51,53. In this way, each stream exits the respective feed channel, is positioned in a selected relative order by the respective selecting channel, and enters the respective connecting channel or channels.

Again with reference to FIG. 3 in particular, the inflow of flow stream B into the layer sequence selecting device and its outflow from the device are in generally opposite directions. As can be understood, a like opposite direction of flow into and from device 20 exists for streams A,C,D.

Layer sequence selecting device 20 beneficially consists of a plurality of plates 62,64,66 with surface channels and bores as shown, which combine to form channels 60a–d. Accordingly, for instance, channel 60b is provided by spaced apart throughbores 67A (inflow),68A (outflow) in plate 62, spaced apart bore holes 67B,68B in plate 64 which register with throughbores 67A,68A, respectively, and an inverse J-shaped channel 70 in a face 71 of plate 64 which registers with an inverse J-shaped channel 72 in a face 73 of plate 66, and connects between bore holes 67B,68B. Similarly, channel 60d is provided by a bore hole 69 (inflow) and spaced apart bore holes 74 (outflow) in plate 62, and a surface channel 75 in a face 76 of plate 62 which registers with a like surface channel in a face 77 of plate 64 and connects between bore hole 69 and bore holes 74.

Alignment pins 78 and alignment bores 79 advantageously provide for alignment of plates 62,64,66 with one another and with face 44 of assembly 12. After alignment, the plates are advantageously removably attached to face 44 by a plurality of threaded bolts 82 (only several shown), which extend though bores 83 of the plates and into threaded bores 84 of assembly 12.

Beneficially, faces 80,76 of plate 62, and face 73 of plate 66 include undercut surfaces 86,87,88 disposed interior of edges of the plates. The undercut surfaces reduce the sealing surface area, thereby increasing the seal surface pressure when the plates are fastened together, to ensure a positive seal between contacting plate surfaces. In this way, flow sequence selecting channels 60a–d are isolated from one another. For purposes of this description, the term "positive seal" means a seal provided by contacting surfaces. Thus, the mechanical clearance necessary between a prior art plug and its plug bore, prevents a positive seal as herein defined.

Conveniently, face 44 to which device 20 is attached, is disposed opposite to a face 90 (see FIG. 2) attached to die body 14 via die plate 16. Alternatively if desired, device 20 could be attached to face 92 or 94 of assembly 12; but in either case, the feed channels and connecting channels would need to be changed so that the feed channel outlets and connecting channel inlets register with channels 60a–d of device 20. Also, block portion 18 could be reconfigured to provide faces 92,94 with the feed channel inlets and face 44, 46 or 48 with the feed channel outlets and connecting channel inlets.

In use, feed streams A,B,C,D enter assembly 12 passing through feed channels 40a–d. Thereafter, the streams enter device 20 and pass through flow sequence selecting channels 60a–d, and exit device 20 and re-enter assembly 12 as follows: stream A enters connecting channel 52, stream B enters connecting channel 50, stream C enters connecting channel 54, and stream D enters connecting channels 51,53, giving a relative order of streams of BDADC. Then, the streams in this order are passed via connecting channels 50–54 to combining portion 56 of assembly 12, in which the individual streams are shaped into a shape suitable for layering and thereafter converged. The composite stream passes from assembly 12 through its exit channel, passes through die plate channel 22 to die body 16, and is extruded from die body 16 with a layer sequence of BDADC.

Depending upon the desired multilayer extrudate, the flow directing block portion may include more or less than five connecting channels, more or less than four feed channels, and an appropriate layer sequence selecting device will be selected. Furthermore, the apparatus could include downstream of face 44, features of the prior art such as a selector plug to change the relative layer sequence received from device 20, or could split a particular connecting channel into subchannels.

Figure 4:
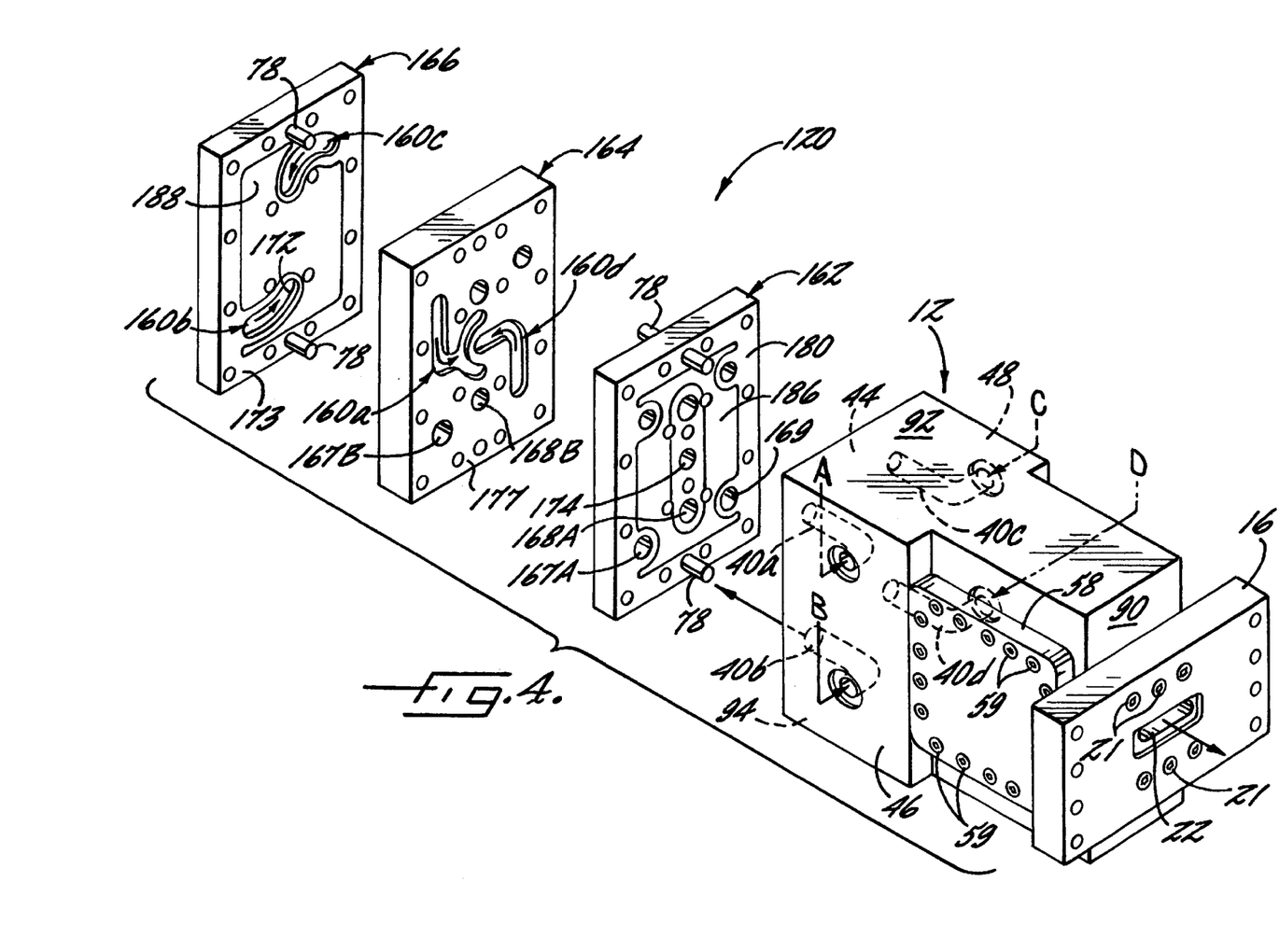
FIGS. 4 and 5 are partially exploded perspective views similar to FIGS. 2 and 3, respectively, of apparatus of FIG. 1 with a different layer sequence selecting device.
Figure 5:
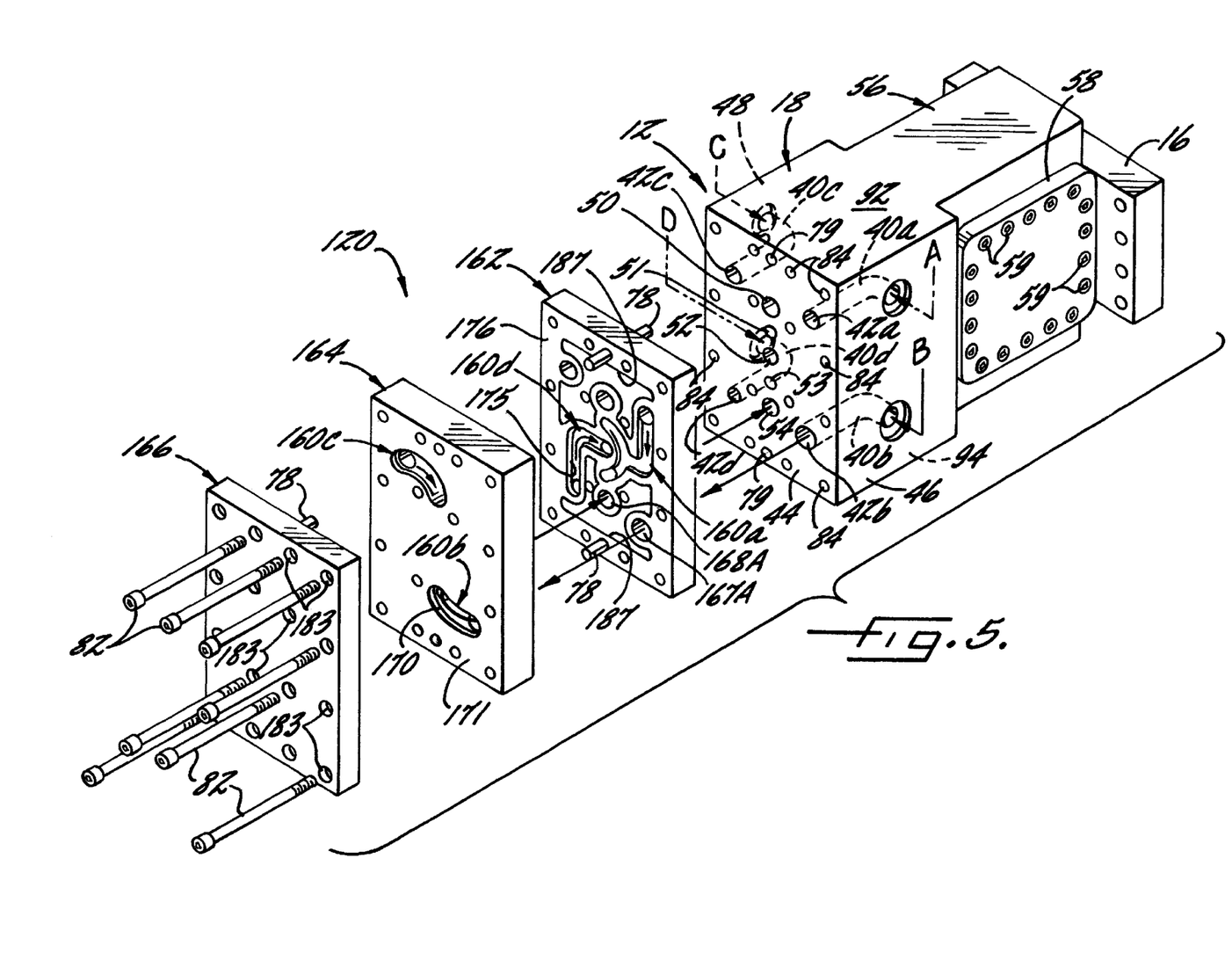

With reference to FIGS. 4 and 5, numerals in the 100 series are used for parts of a layer sequence selecting device 120 like device 20, and its description is correspondingly abbreviated; and easy interchangeability of device 120 for device 20, and its use with assembly 12, die plate 16 and die body 14 of apparatus 10, are indicated. Specifically and referring briefly to FIG. 3, fasteners 82 are removed and device 20 is detached from assembly 12, and thereafter referring to FIG. 5 in particular, plates 162,164,166 of device 120 are aligned with one another and with assembly 12 using alignment pins 78 and then fastened to assembly 12 using fasteners 82.

Layer sequence selecting device 120 includes a plurality of flow sequence selecting channels 160a–d. Arrows within each channel 160 indicate direction of flow. Each flow sequence selecting channel registers with one of the feed channels and at least one connecting channel. Thus, channel 160a registers with channels 40a,51,53, channel 160b registers with channels 40b,54, channel 160c registers with channels 40c,50, and channel 60d registers with channels 40d,52. Each stream exits the respective feed channel, passes through the respective flow sequence selecting channel, and enters the respective connecting channel or channels. In use, the result is a relative order of streams of CADAB.

With reference to FIG. 5 in particular, the inflow of stream B into the layer sequence selecting device and its outflow from the device are in generally opposite directions. As can be understood, a like opposite direction of flow into and from device 120 exists for streams A,C,D.

Layer sequence selecting device 120 beneficially consists of plates 162,164,166 with surface channels and bores as shown, which combine to form channels 160a–d. For instance, channel 160b is provided by spaced apart throughbores 167A (inflow),168A (outflow) in plate 162, spaced apart bore holes 167B,168B in plate 164 which register with throughbores 167A,167B, respectively, and an arc-shaped channel 170 in a face 171 of plate 164 which registers with an arc-shaped channel 172 in a face 173 of plate 166, and connects between bore holes 167B,168B. Similarly, channel 160d is provided by a bore hole 169 (inflow) and a bore hole 174 (outflow) in plate 162, and a surface channel 175 in a face 176 of plate 162 which registers with a like surface channel in a face 177 of plate 164 and connects between bore hole 169 and bore hole 174.

Beneficially, as with device 20, faces 180,176 of plate 162, and face 173 of plate 166 include undercut surfaces 186,187,188, which reduce the sealing surface area, thereby increasing the seal surface pressure when the plates are fastened together, to ensure a positive seal between contacting plate surfaces.

Advantageously, not only can device 120 be exchanged for device 20 without disassembly of other extrusion apparatus structure, but in certain instances, individual plates from different layer sequence selecting devices can be interchanged. Also if desired, the layer sequence provided by device 20 or 120 can be obtained by use of only two plates. A difference between a three plate system and a two plate system, relates to the flow sequence selecting channels. Specifically, in the three plate system shown, channel halves register to form a channel, whereas in a two plate system, each channel would consist of a channel half only. The latter channel type may be suitable for polymers exhibiting a lower propensity for degradation. As can be understood, it would be advantageous to use four or more plates in certain instances.

Referring to FIG. 6, layer sequence selecting device 20 is used with a flow directing block 118, instead of block portion 18 of assembly 12 of FIG. 1. Otherwise, block 118 is like block portion 18 in its details. Thus, identical numerals, letters and arrows are used in connection with block 118 as are used for block portion 18, and the description of block 118 is correspondingly abbreviated such that reference should be made to the description of block portion 18 for details of block 118.

As previously indicated, block 118 can be used with a combining block (not shown) like combining portion 56 in function. In such case, the combining block would, as in FIG. 1, be in flow communication with a downstream die body for coextrusion of a multilayer extrudate.

Alternatively, block 118 can be used with a multimanifold die body (not shown). In such case, the streams in the relative order selected by the layer sequence selecting device are directed by connecting channels 50–54 to the multimanifold die body, and the multimanifold die body carries out the processing steps of shaping individual streams into a shape suitable for layering, converging the shaped streams in a channel (not shown) leading to an extrusion orifice, and coextrusion of a multilayer extrudate.

Having described the invention in detail and by reference to preferred embodiments thereof, it will be apparent that modifications and variations are possible without departing from the scope of the invention defined in the appended claims. Several variants or modifications have been briefly mentioned for purposes of illustration.

What is claimed is:

1. A coextrusion apparatus comprising an assembly for directing flow of a plurality of streams and for combining the streams, and in fluid communication therewith, an interchangeably disposed device for selecting a relative sequence of layers in the combined stream;

wherein the directing/combining assembly comprises
a plurality of feed channels for directing a plurality of feed streams to the interchangeably disposed, layer sequence selecting device; and
a plurality of connecting channels in fluid communication with a downstream combining channel;
wherein said layer sequence selecting device comprises a plurality of flow sequence selecting channels each registering with one of said feed channels and at least one of said connecting channels; and
wherein a feed channel exit opening is disposed relative to an entry opening of a respective connecting channel so that flow through said exit opening is in a direction generally opposite to the direction of flow through said entry opening.

2. The coextrusion apparatus of claim 1, wherein said layer sequence selecting device comprises a plurality of plates which cooperate to form said flow sequence selecting channels.

3. The coextrusion apparatus of claim 1, wherein said layer sequence selecting device is removably attached to an exterior face of said assembly.

4. The coextrusion apparatus of claim 3, wherein said layer sequence selecting device is directly attached to said face.

5. The coextrusion apparatus of claim 1, wherein said assembly comprises a first face attached to a die body disposed downstream of said assembly and comprising an extrusion orifice for coextrusion of a multilayer extrudate, and wherein said layer sequence selecting device is removably attached to a second face disposed opposite to said first face.

6. The coextrusion apparatus of claim 2, wherein adjacent plates are in face to face contact.

7. The coextrusion apparatus of claim 1, wherein said assembly comprises a flow directing block portion comprising said feed channels and said connecting channels, and a combining portion comprising said combining channel.

8. The coextrusion apparatus of claim 1, wherein said assembly comprises a flow directing block comprising said feed channels and said connecting channels, and a combining block comprising said combining channel.

9. The coextrusion apparatus of claim 1, wherein said feed channel exit opening and said entry opening are disposed relative to one another such that a stream is generally parallel at outflow from and inflow to said layer sequence selecting device.

10. A coextrusion apparatus comprising a flow directing block, an assembly for combining a plurality of streams and for coextrusion of a multilayer extrudate, and in fluid communication therewith, an interchangeably disposed device for selecting a relative sequence of layers in the combined stream;
wherein said flow directing block comprises
a plurality of feed channels for directing a plurality of feed streams to the interchangeably disposed, layer sequence selecting device; and
a plurality of connecting channels in fluid communication with the combining/extruding assembly;
wherein said layer sequence selecting device comprises a plurality of flow sequence selecting channels each registering with one of said feed channels and at least one of said connecting channels; and
wherein a feed channel exit opening is disposed relative to an entry opening of the respective connecting channel so that flow through said exit opening is in a direction generally opposite to the direction of flow through said entry opening.

11. The coextrusion apparatus of claim 10, wherein said layer sequence selecting device comprises a plurality of plates which cooperate to form said flow sequence selecting channels.

12. The coextrusion apparatus of claim 10, wherein said layer sequence selecting device is removably attached to a face of said flow directing block.

13. The coextrusion apparatus of claim 12, wherein said layer sequence selecting device is directly attached to said face.

14. The coextrusion apparatus of claim 10, wherein said flow directing block comprises a first face attached to said assembly, and said layer sequence selecting device is removably attached to a second face of said flow directing block disposed opposite to said first face.

15. The coextrusion apparatus of claim 11, wherein adjacent plates are in face to face contact.

16. The coextrusion apparatus of claim 10, wherein said feed channel exit opening and said entry opening are disposed relative to one another such that a stream is generally parallel at outflow from and inflow to said layer sequence selecting device.

* * * * *